United States Patent [19]

Atkinson

[11] Patent Number: 4,559,852
[45] Date of Patent: Dec. 24, 1985

[54] METHOD FOR SHANKING ROCK BITS
[75] Inventor: Gerald O. Atkinson, Pasadena, Tex.
[73] Assignee: Hughes Tool Company-USA, Houston, Tex.
[21] Appl. No.: 625,479
[22] Filed: Jun. 28, 1984
[51] Int. Cl.⁴ ............................................... B21K 5/02
[52] U.S. Cl. ................................... 76/108 A; 82/1 C; 82/45; 279/1 L; 29/466; 51/288; 409/66
[58] Field of Search ............... 76/108 A; 82/40 R, 45, 82/1 C; 409/66, 73, 76; 29/464, 466; 279/1 L, 1 J; 51/288

[56] References Cited
U.S. PATENT DOCUMENTS
2,070,898 2/1937 Hall et al. ......................... 279/1 L
2,979,993 4/1961 Hedstrom ............................. 409/66
4,209,124 7/1978 Baur ..................................... 228/182
4,414,734 6/1980 Atkinson .............................. 29/464

Primary Examiner—Roscoe V. Parker
Attorney, Agent, or Firm—Robert A. Felsman

[57] ABSTRACT

A method for shanking a rock bit utilizing a shank locator and a cone locator, each with tapered surfaces to engage respectively the tail stock of a lathe and the cones of a rock bit, to accurately align the body and the cones of the bit concentric with the design centerline of the bit. The lathe and cone locators each have interior conical surfaces to assure accurate, coaxial alignment of the shank end and the cone end of the bit. A compensating chuck is used to grip the cone end of the bit body and firmly hold the normally uneven surfaces while the threads are being machined.

3 Claims, 5 Drawing Figures

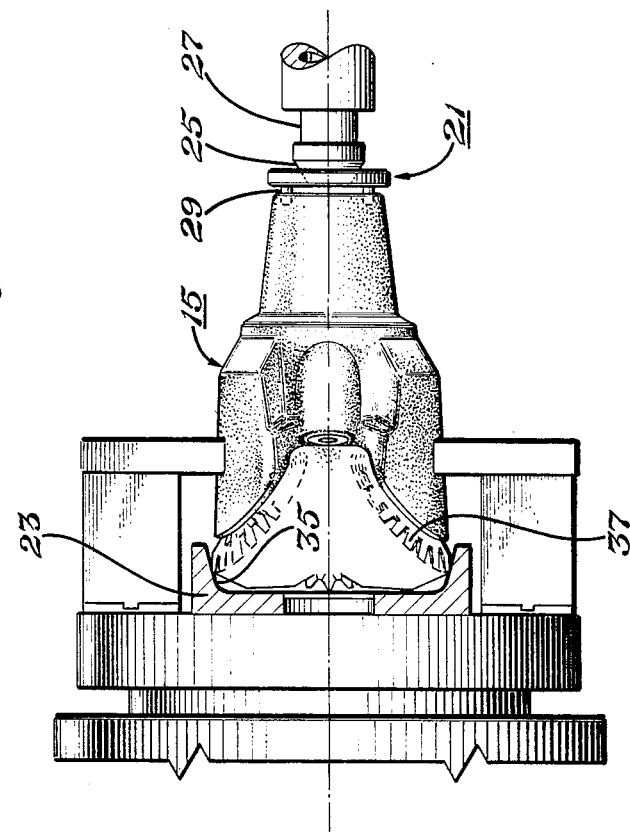
Fig. 2
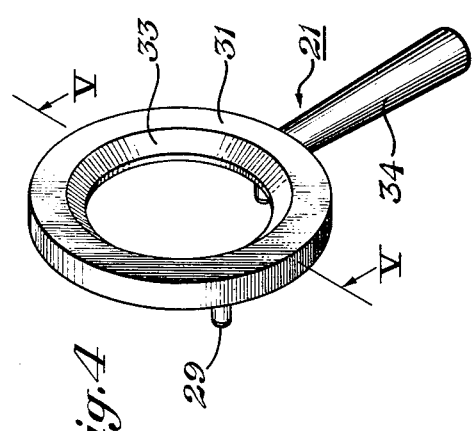
Fig. 4
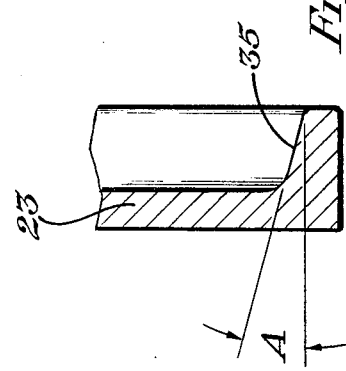
Fig. 3
Fig. 5

METHOD FOR SHANKING ROCK BITS

BACKGROUND OF THE INVENTION

1. Field of the Invention

This invention relates in general to earth boring bits and in particular to methods for threading bits after assembly and welding of the sections of which they are composed.

2. Background Information

Earth boring bits of the rolling cone type are often called "rock bits", even though some can drill geological formations softer than those commonly classified as rock. The rock bit has many of the features found in the original two cone bits of Howard R. Hughes, U.S. Pat. No. 930,759, Aug. 10, 1909.

The body of a typical, contemporary bit is constructed of three sections, assembled to engage across 120 degree, machined faces and welded to form an integral body unit. A cone is mounted, prior to welding, on a cantilevered bearing shaft that depends from each section.

In recent years attention has been focused on improvements to the welding and assembly procedures to improve the geometry, the dimensional accuracy and the integrity to design of the rock bit.

A method to improve the accuracy of the assembly and welding of the sections of a rock bit is show in U.S. patent of George W. Baur, U.S. Pat. No. 4,209,124, Rock Bit Assembly Method, June 24, 1980. Here, a shank positioner and a fixed ring are positioned with a fixture to hold the sections and assembled cones to minimize slippage of the sections during assembly and welding.

Another method to improve integrity to rock bit design parameters is disclosed in my previous U.S. Pat. No. 4,414,734, Triad For Rock Bit Assembly, Nov. 15, 1983. A specially shaped dowel called a triad is used to maintain the 120 degree faces of the sections in the intended relationship. This method further assures accuracy of alignment of the sections during assembly and welding.

Still, there is need for additional accuracy, especially in machining the threads on the shank of bits for accurate alignment of the sections and cones with the design centerline or rotational axis of the bit. Even though the sections of the bit are accurately aligned and welded, performance of the bit suffers if the threads of the shank are misaligned from the design centerline. The resulting eccentric rotation of the bit can produce accelerated wear of the cones and of the supporting bearings.

SUMMARY OF THE INVENTION

The general object of the invention is to provide an improved method for machining the threads on the shank of a rock bit such that the threads are more nearly coaxial or homocentric with the design centerline of the cones and the bit body.

Accordingly, the invention is an improved method of threading the shank of a rock bit that includes the formation of a positioner such as a dowel hole in each head section the bit, welding the head sections into an integral body after assembly with their cones, positioning the bit in a cone locator in a compensating chuck, placing a shank locator in the positioners in the head section, inserting the tail stock of a lathe in the shank locator, energizing the compensating chuck to clamp the bit, removing the tail stock, machining the threads and releasing the compensating chuck and the bit. The cone locator and the shank locator have centering configurations, such as a tapered or conical interior surface that assures accurate, coaxial alignment with the design centerline.

The above as well as additional objects, features and advantages of the invention will become apparent in the following description.

DESCRIPTION OF THE FIGURES OF THE DRAWING

FIG. 2 is a side elevational view of the bit, compensating chuck and tailstock of FIG. 1, with a shank locator and it dowels being positioned in mating dowel holes in the shank end of the bit.

FIG. 3 is a fragmentary, sectional view to show the tapered configuration of the cone locator used with the compensating chuck to align the cone end of the bit.

FIG. 4 is a perspective view of the shank locator.

FIG. 5 is a cross sectional view of the shank locator as seen looking along the lines V—V of FIG. 4.

DESCRIPTION OF THE PREFERRED EMBODIMENT

Figure 1:
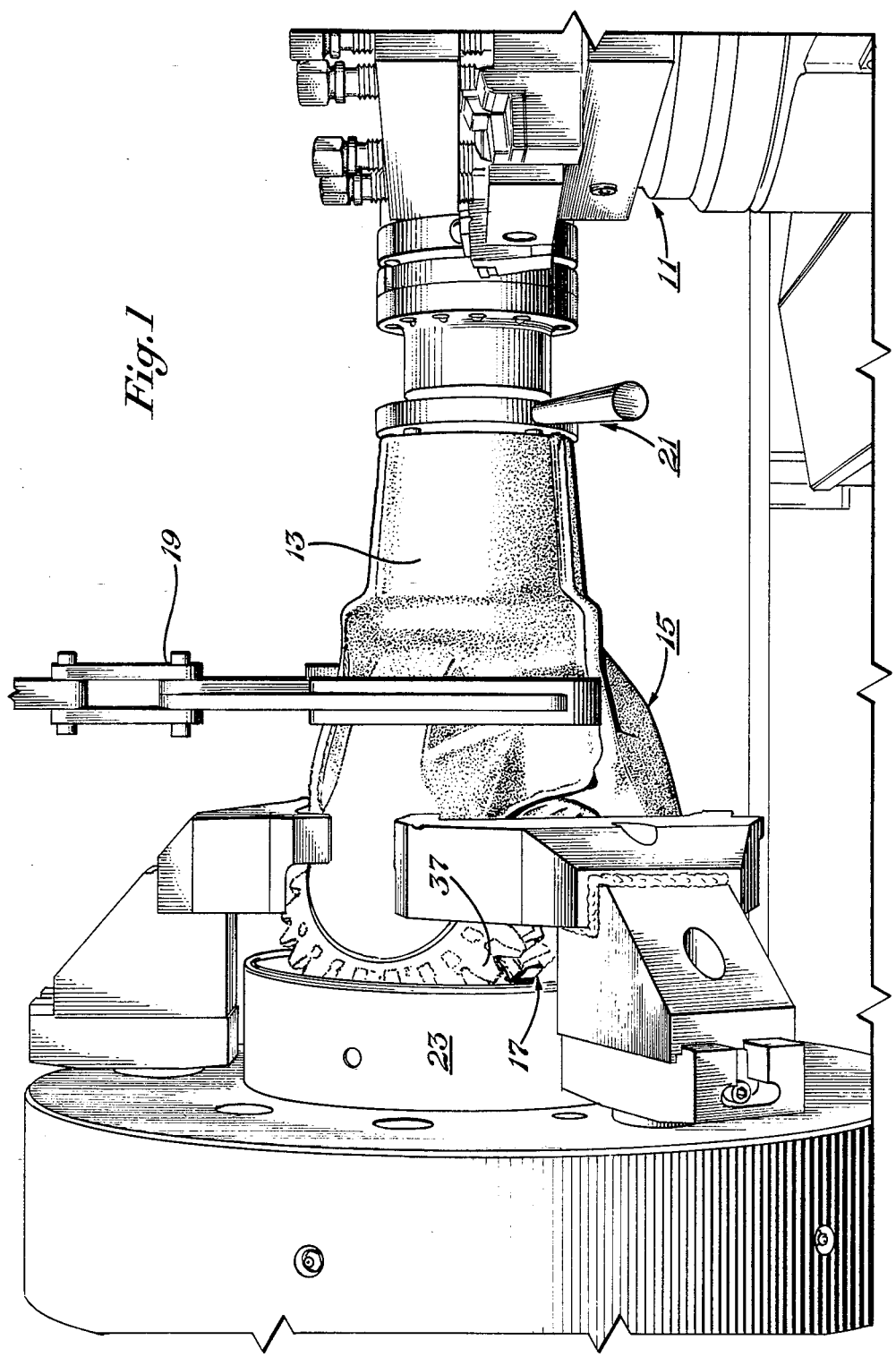
FIG. 1 of the drawings illustrates in perspective a rock bit, including its three head sections and assembled cones, being supported in a horizontal position between a compensating chuck and the tailstock of a lathe in preparation for threading the shank.

The numeral 11 in the drawing designates a lathe used in this instance to machine threads on the shank end 13 of a rock bit 15 having a plurality of cones 17 for rotation upon and drilling through geological formations. As shown in FIG. 1, the bit 15 is held in a horizontal position by tongs 19 above the lathe by a hoist (not shown).

While in the horizontal position, the bit 15 is positioned accurately on the centerline of the lathe 11, with the cones 17 and body of the bit 15 located concentric therewith. Accurate location of the bit 15 on the rotational axis of the lathe is achieved by the use of a shank locator 21 on the shank end 13 of the bit, and a cone locator 23 on the cone end of the bit.

As best seen in FIG. 2, the shank locator 21 is adapted to receive the tapered end 25 of the tail stock 27 of the lathe 11. Protruding from the shank locator 21 are three positioners, here dowels 29, one for each of the three sections which constitute the body of the most common, three cone type of rock bit shown in the drawings. Although not illustrated in the drawings, each of the sections of the bit 15 has a 120 degree machined face that mates with a similar face on the other sections. When subsequently welded after assembly of the faces, an integral bit body is formed, as illustrated in FIGS. 1 and 2.

The construction of the shank locator 21 is better shown in FIGS. 4 and 5, consisting of an annular body 31 having a tapered or conical interior surface 33, three dowels 29 and a handle 33. In the cross sectional view of FIG. 5 the angle B is preferably *thirty* degrees and matches conical surface 25 of the tail stock 27. The use of these two matching surfaces, and accurately drilled dowel holes in each of the sections of the body of the bit 15, positions the shank end of the bit accurately on the rotational axis of the lathe 11.

The cone locator 23 has a conical interior surface 35 at an angle A of preferably *fifteen* degrees, as may be best seen in the cross sectional view of FIG. 2 and also in the enlargement of FIG. 3. The outermost or heel teeth 37 engage the conical or tapered surface 35, which positions the cones 17 of the bit in identical relationships with the bearings upon which they are supported. As a result, the cone end of the bit, as well as the shank of the bit are accurately positioned on the rotational axis of the lathe.

In view of the above description of apparatus the steps of the method may be more fully understood. Each forging or casting of which the head sections of the bit are composed is processed by machining a dowel hole in the upper end of the shank, which will subsequently mate with one of the dowels 29 in the shank locator 21 in a accurate and predetermined relationship to the machined 120 faces.

Each of the head sections of the bit has a bearing formed by various procedures such as machining, the application of metallurgical treatments and grinding. The dowel holes described above are formed accurately with respect to these bearing surfaces, as well as the 120 degree faces of each head section.

Cones 17 are assembled on the bearing surfaces of each head section with one of the known fastener means, such as the prior art ball retainers or resilient rings.

Then, the 120 faces of the head sections are aligned and assembled by an accurate technique such as using a triad as disclosed in the previously mentioned U.S. Pat. No. 4,209,124.

The head sections are then welded to form an integral body, using one of the known welding methods such as the electron beam process.

Next, the welded bit is positioned such that the heel teeth 37 of the cones 17 engage the conical or interior surface 35 of the cone locator 23. This urges the cones 17 to identical positions on their respective bearing shafts and, assuming accurate processing of the cones and the bearings on which they are supported, positions the design centerline of the cone end of the bit on the rotational axis of the lathe.

The shank locator 21 is positioned such that the dowels 29 mate with the dowel holes formed in the upper end of the head sections of the bit. Then the tail stock 27 of the lathe and its tapered end 25 is urged against the conical surface 33 of the shank locator. This assures that the shank end of the bit and its design centerline is accurately positioned concentrically with the axis of the lathe.

Once the bit is accurately positioned through use of the cone and shank locators, the jaws of a compensating chuck are energized to grip the body of the bit 15. A compensating chuck is one in which the chuck jaws grip the workpiece equidistant from the center of the chuck, through utilization of an actuator that permits the jaws to float and engage independently of the chuck center. One satisfactory compensating chuck is manufactured by N. A. Woodworth Company of Detroit, Mich., under the trademark "Universal Ball-Lok".

After chucking the bit, the threads are turned by a cutting tool in the prior art manner, and then the jaws of the compensating chuck are released and the bit removed.

It should be apparent from the foregoing description that I have provided an invention having significant advantages. The use of a method employing the above described shank locator 21 and cone locator 23, with a compensating chuck, enables more accurate machining of the threads of the shank of a rock bit with respect to the design centerline. This assures that the bit will rotate when drilling about an axis that coincides with that of the drill collars and drill pipe, avoiding damage to the bit that can occur when there is eccentric rotation.

While I have shown and described my invention in only the preferred form, it should be apparent that it is not thus limited, but is susceptible to various changes and modifications without departing from the spirit thereof.

I claim:

1. A method of threading the shank end of a rock bit that has rolling cones, each supported on a cantilevered bearing shaft extending from the cone end of a head section with machined faces joined with those of other mutually welded head sections to form a body, threaded at the upper end, the method comprising the steps of:
    providing a locator means at the upper end of each head section in a predetermined relationship to the machined faces;
    positioning the bit in a cone locator to engage the outermost teeth of each cone to position the cones on the design centerline of the bit;
    mating a shank locator with the locator means;
    inserting the tail stock of a lathe with the shank locator to hold the upper end of the bit about the design centerline;
    energizing a compensating chuck to clamp the bit;
    removing the tail stock;
    machining the threads on the shank of the bit body;
    releasing the compensating chuck and removing the bit.

2. A method of threading the shank end of a rock bit that has rolling cones, each supported on a cantilevered bearing shaft extending from the cone end of a head section with machined faces joined with those of other head sections to form a body, threaded at the upper end, the method comprising the steps of:
    providing a locator means at the upper end of each head section in a predetermined relationship to the machined faces;
    assembling aligned faces of the head sections;
    welding the head sections together to form an integral rock bit;
    positioning the bit in a cone locator to engage the outermost teeth of each cone to position the cones on the design centerline of the bit;
    mating a shank locator with the locator means;
    inserting the tail stock of a lathe with the shank locator to hold the upper end of the bit about the design centerline;
    energizing a compensating chuck to clamp the bit;
    removing the tail stock;
    machining the threads on the shank of the bit body;
    releasing the compensating chuck and removing the bit.

3. A method of threading the shank end of a rock bit that has rolling cones, each supported on a cantilevered bearing shaft extending from the cone end of a head section with machined faces joined with those of other head sections to form a body, threaded at the upper end, the method comprising the steps of:
    machining a dowel hole in the upper end of each head section in a predetermined relationship to the machined faces of the head sections;
    assembling cones on each bearing of each head section;
    assembling aligned faces of the head sections;

welding the head sections together to from an integral rock bit;

positioning the bit in a cone locator having a tapered interior surface to engage the outermost teeth of each cone to position the cones on the design centerline of the bit;

placing a shank locator in the dowel holes in the end of the head sections;

inserting the tail stock of a machine tool in an interior tapered surface of the shank locator to hold the upper end of the bit about the design centerline;

energizing a compensating chuck to clamp the bit;

removing the tail stock;

machining the threads on the shank of the bit body;

releasing the compensating chuck and removing the bit.

* * * * *